Feb. 17, 1948.  R. E. WEILER  2,435,990
GAS TURBINE LUBRICATING OIL COOLING AND AIR INLET DEICING SYSTEM
Filed Aug. 17, 1945
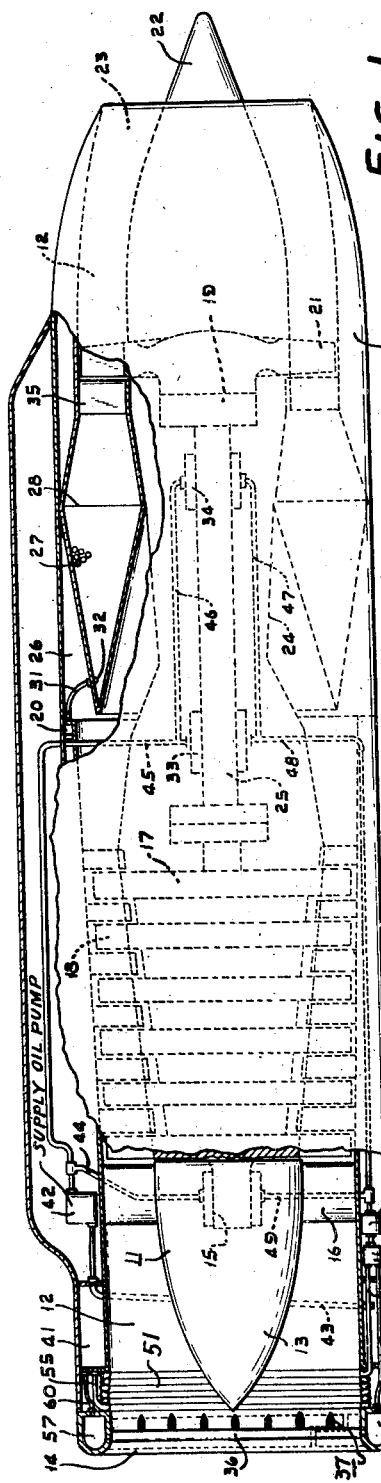
INVENTOR
ROBERT E. WEILER
BY
ATTORNEY

UNITED STATES PATENT OFFICE 2,435,990

GAS TURBINE LUBRICATING OIL COOLING AND AIR INLET DEICING SYSTEM

Robert E. Weller, Prospect Park, Pa., assignor to Westinghouse Electric Corporation, East Pittsburgh, Pa., a corporation of Pennsylvania Application August 17, 1945, Serial No. 611,020

2 Claims. (Cl. 60—35.6)

The invention relates to power plants, more particularly to means for cooling lubricating oil and de-icing the air inlet to the power plant, and it has for an object to provide improved apparatus of the character set forth.

The invention, while not limited thereto, is particularly adapted to be used to cool lubricating oil and de-ice the inlet of a gas turbine power plant like that disclosed in the patent to Stewart Way, No. 2,405,723, granted August 13, 1946, and assigned to the assignee of the present invention. Such a power plant includes an axial-flow air compressor, a gas turbine driving the compressor, combustion apparatus utilizing compressed air supplied thereto by the compressor to provide heated and compressed gases for operation of the turbine, and a nozzle utilizing gases exhausting from the turbine to provide a propulsion jet, all of these components being housed in line within a tubular casing. A plant of this character is particularly suitable for propelling aircraft at high speeds and it operates generally as follows: Air enters the forward end of the tubular casing for compression by the compressor; the compressed air is then heated in the heating or combustion apparatus by the combustion of fuel supported by the compressed air to provide motive fluid delivered to the turbine, which drives the compressor; and motive fluid issuing from the turbine is discharged through the propulsion nozzle as a jet, the reaction of which serves to propel the aircraft.

In the operation of a power plant of the above-mentioned type, it is often desirable to place a grille or screen across the air inlet to the power plant. This is done primarily to prevent large objects of foreign matter from entering the compressor and consequent damage or destruction of the power plant. However, under adverse weather conditions, icing may occur on the grille and at the compressor inlet. When ice forms on the grille, the effective cross-sectional area is reduced, thus reducing the quantity of air flowing to the air heating apparatus. This reduction in air flow will diminish the thrust or power output; also, due to the fact that a reduced quantity of combustion and cooling air is flowing through the air heating apparatus, the exhaust gas temperature may rise to a dangerous degree, thereby causing damage to, or destruction of, the power plant.

In accordance with the present invention, there is provided means which will prevent ice forming on the grille and at the air compressor inlet and at the same time act as a cooler for the lubricating oil system.

Another object of the invention is to provide a hollow grille in the air inlet of an aircraft plant, adapted to have circulated therethrough heated oil from the lubricating system, to cool the oil and de-ice the grille and the inlet to the power plant.

A still further object of the invention is to provide a combined hollow grille and lubricating oil cooler which will effect an overall weight reduction and a minimum air pressure drop thereover, and at the same time eliminate special de-icing apparatus.

These and other objects are effected by the invention as will be apparent from the following description and claims taken in connection with the accompanying drawings, forming a part of this application, in which:

Fig. 1 is a side elevational view of a gas turbine power plant in which the present invention has been incorporated, a portion of the outer casing structure being broken away to show details of construction;

Fig. 2 is an enlarged sectional view of the inlet portion of the gas turbine power plant as shown in Fig. 1;

Fig. 3 is a sectional view taken along the line III—III of Fig. 2; and

Fig. 4 is an enlarged detail sectional view of the hollow grille structure taken on the line IV—IV of Fig. 2.

Referring now to the drawings, the power plant shown in Fig. 1 comprises in general an outer tubular casing structure 10, open from end to end and having a central core 11 providing, with the casing, an annular flow passage 12, which, if the plant is to be used for propelling an airplane, is adapted to extend fore and aft with respect to the latter.

The central core structure 11 is supported by the outer casing structure 10 along its longitudinal axis and includes a hollow fairing cone 13 defining, with the forward or left end of the casing 10, an air inlet 14. The fairing cone 13 may be utilized to house a starter, gearing for driving auxiliary apparatus (not shown), and a front bearing 15.

The core 11 also includes a rotor 17 of an axial-flow compressor 18, a rotor 19 of a gas turbine 21 and a longitudinally-adjustable conical tailpiece 22 which defines, with the rear end of the casing 10, an adjustable propulsion nozzle 23.

The intermediate portion of the core structure 11 between the compressor 18 and the turbine 21 comprises an inner wall structure 24 which houses a shaft 25, supported by an intermediate bearing 33 and a rear bearing 34, respectively, for connecting the turbine rotor 19 and compressor rotor 17. The inner wall structure 24 defines, with the outer casing 10, an annular chamber 26 connecting the compressor blade passage and the turbine blade passage.

The chamber 26 is provided with suitable air heating means, such as shown in the copending application of Stewart Way et al., Serial No. 511,468, filed November 23, 1943, for heating the air compressed by the compressor. In the embodiment herein shown, an annular, perforated, tapered burner tube 27 is mounted in the annular chamber 26 with its open end 28 directed downstream. Fuel is supplied to the burner tube 27 from a manifold 20, connected to a fuel supply (not shown) and is fed through branch pipes 31 to atomizing nozzles 32 extending into the burner tube. Suitable means, including spark plugs (not shown) are provided for igniting the air-fuel mixture in the burner tube.

In operation, air enters at the inlet 14, is compressed by the compressor 18, and flows into the annular chamber 26. The compressed air then passes through the openings in the walls of the burner tube 27 and mixes with the atomized fuel supplied by the nozzles 32. The air and fuel mixture is ignited by the spark plugs and burns steadily thereafter. The motive fluid, comprising the products of combustion and the excess air, flows from the burner tube 27 and is directed by guide vanes or nozzles 35 into the blade passage of the turbine rotor 19. The turbine extracts at least sufficient energy from the motive fluid to drive the compressor 18 and other auxiliary apparatus. The spent gases leaving the turbine are discharged through the propulsion nozzle 23 at a high velocity so that the remaining available energy of the motive fluid is effective to propel the aircraft. The tailpiece 22 is preferably axially movable with respect to the casing 10 so that the back pressure on the turbine and the jet effect produced by the propulsion nozzle may be varied.

To prevent foreign objects from being drawn into the compressor 18 of the above-mentioned power plant, and consequent damage thereto, a grille 36 is provided in the inlet 14. Although the grille 36 has the disadvantage of additional weight, tendency to decrease the ram effect, and icing under adverse weather conditions, which throttles the air flowing therethrough with the resultant danger as mentioned heretofore, it is advantageous, nevertheless, to incorporate it in the inlet.

To overcome the disadvantages of additional weight and ice formation on the grille 36, it is incorporated as part of a heat exchange apparatus, generally indicated at 37, for the lubricating system, and is formed by utilizing two groups of parallel, spaced tubes or foils 38 and 39 spaced adjacent, and approximately at right angles, to each other. To form a more rigid structure, the trailing edges of one group of tubes are notched, at 40, as shown in Fig. 4, to receive the adjacent portion of the leading edges of the other group of tubes, and they are preferably welded to form a unitary rigid structure. These two groups of tubes 38 and 39 are adapted to form a fluid flow path for a portion of the heated oil returning from the bearings, which circulates therethrough to be cooled. At the same time, heat dissipated by the cooling of the oil heats the grille 36 to a temperature high enough to prevent ice formation thereon.

Briefly, the lubricating system for the power plant in which the grille is incorporated comprises the front, intermediate, and rear bearings 15, 33 and 34, respectively, supplied with lubricating oil from a reservoir 41, which, in the embodiment shown, is placed around the inlet portion of the power plant intermediate the outer shell 10 and the inner annular flow path 12. However, this reservoir 41 may be situated at any convenient location. Preferably a forced feed lubricating oil pump 42, driven in any suitable manner, is disposed intermediate the reservoir 41 and the bearings. The oil pump 42 withdraws oil from the lower portion of the reservoir 41 by means of a suction pipe 43, and discharges this oil at high pressure to a plurality of supply conduits 44, 45 and 46, for delivery to the front, intermediate and rear bearings 15, 33 and 34, respectively, and to any other additional apparatus which may require lubrication.

When the oil has passed through the bearings to lubricate and cool the same, it is preferably collected and delivered by a plurality of oil return conduits 47, 48 and 49 to a scavenging oil pump means, generally indicated at 50. This scavenging pump 50 is more fully described in the copending application of Albert S. Thompson, Serial No. 520,488, filed January 31, 1944, now Patent No. 2,402,467, and assigned to the assignee of the present invention. While the details of the scavenging pump form no part of the present invention, in general, such a pump assures of removal of oil after it passes through the bearings, thus helping to prevent leaks, and to provide a source of pressure to force the heated oil through the heat exchange apparatus 37. After the oil passes through the heat exchange apparatus 37 and is cooled, it flows into the reservoir 41 to be recirculated.

Referring more specifically to the heat exchange apparatus, at 37, there is provided, in addition to the grille 36, a heat exchanger 51 preferably of the coil type and, as shown in Fig. 2, it is wrapped around the outer wall of the annular flow path 12 adjacent the air inlet 14, and is preferably connected in parallel flow relation with the grille 36. Both the grille 36 and the coil type heat exchanger 51 receive their proportionate quantities of heated oil from a distributing means 52, through conduits 53 and 54, respectively. The distributing means 52 is supplied with heated oil, by the scavenging pump 50, and it may be controlled by the thermostat 65 at the outlet of the grille 36, connected by wiring 66 to the distributor 52, to proportion the flow of oil to the grille 36 and the heat exchanger 51 to maintain the grille at a temperature high enough to prevent icing.

A portion of the heated oil leaving the distributor 52 passes, through the conduit 54, to the heat exchanger 51 and is cooled as it flows in a spiral path therethrough, by the air entering the annular inlet adjacent thereto, after which it passes through a conduit 55 to the reservoir 41 to be recirculated.

The remaining portion of the heated oil leaving the distributor flows through the conduit 53 to the grille 36 in parallel flow relation to the coil type heat exchanger 51. The grille is provided with an inlet header 56 for receiving the heated oil from the conduit 53. Referring to Fig. 3, the inlet header 56 extends approximately 180 degrees around the inlet of the annular flow path 12, and is positioned so as to supply heated oil to one end of each of the two groups of tubes 38 and 39. Substantially half of the heated oil will flow in parallel paths vertically, and the remainder will flow in parallel paths horizontally, as viewed in the drawings.

After the heated oil passes through the two groups of tubes 38 and 39 and is thereby cooled, it discharges into an outlet header 57, also positioned so as to extend approximately 180 degrees around the annular flow path, and to overlap the inlet header in part, at 58, in order to provide an outlet for each tube in both groups of tubes 38 and 39. After discharging into the header 57, the cooled oil flows through a conduit 60 to the reservoir 41 to be recirculated.

It can be seen that as the heated oil flows through the two groups of tubes 38 and 39, which form the grille 36, the heated oil will be cooled by the air flowing thereover into the annular inlet, and at the same time the grille 36 will be heated by the oil and, by thermostatic control of the distributor 52, enough heated oil will flow therethrough to maintain the temperature of the grille 36 sufficiently high to prevent icing thereof.

It should be noted that by combining the hollow grille 36 with the coil type heat exchanger 51, the size and weight of the latter will be reduced proportionately and the weight of the grille 36 will be minimized also, without materially reducing the strength of the grille structure.

Another feature is that by circulating the heated oil through the hollow grille 36 to de-ice the same, the need for additional de-icing equipment for the power plant is eliminated.

It is to be understood that under certain operating conditions, depending upon the size of the grille structure, it may be desirable to have all of the heated oil circulated through the grille to prevent ice accumulation thereon.

While the invention has been shown in but one form, it will be obvious to those skilled in the art that it is not so limited, but is susceptible of various changes and modifications without departing from the spirit thereof.

What is claimed is:

1. In an aircraft power plant comprising an air compressor, an inlet constituting an annular flow path for said air compressor, a combustion chamber for heating the air compressed by said air compressor, a gas turbine for driving said compressor, said turbine being motivated by the heated air leaving said combustion chamber, and an exhaust nozzle for discharging the heated air leaving said turbine to propel the aircraft; a plurality of bearings for said power plant, a forced feed recirculating lubrication system for said bearings, a coil type heat exchanger, disposed adjacent to and around said annular flow path at said air inlet, for cooling a portion of the lubricating oil, a grille disposed in said air inlet to prevent foreign objects from entering said air compressor and subject to ice formation thereon and consequent throttling of said air inlet, said grille being formed of a pair of groups of parallel spaced tubes, the groups being adjacent and at right angles to each other, said tubes providing a fluid flow path in parallel flow relation to said heat exchanger to cool another portion of the lubricating oil, a pumping means for withdrawing lubricating oil from said bearings, a distributing means for distributing the oil discharged by said pumping means, said distributing means controlling the proportionate flow of returning oil to said heat exchanger and to said tubes, which form the grille, to heat said grille to prevent ice formation thereon and to cool the oil flowing therethrough, and conduit means for returning the lubricating oil for recirculation after being discharged from said grille and said heat exchanger.

2. In an aircraft power plant, an air compressor and a gas turbine each having a rotor; a shaft joining said rotors, whereby the turbine drives the compressor; combustion apparatus for heating air compressed by said compressor, said heated air and the products of combustion comprising the motive fluid for said turbine; casing structure surrounding the compressor and including a portion extending upstream therebeyond with the extending portion defining an air inlet for the compressor; a hollow stationary structure disposed in said air inlet in the path of air passing through the latter and subject to formation of ice thereon with consequent throttling of said inlet; a plurality of bearings for the shaft and rotors; a forced feed recirculating lubrication system for said bearings, said system including a reservoir, a supply conduit between the reservoir and the bearings and including means for pumping lubricant from the reservoir to the bearings, a return conduit between the bearings and the reservoir and including means for pumping lubricant from the bearings to the reservoir, a lubricant cooler in the return conduit, distributing means between the bearings and the reservoir in the return conduit, and a branch conduit including the hollow stationary structure providing communication between the distributing means and the reservoir in by-passing relation to the lubricant cooler, said distributing means proportioning the flow of lubricant from the bearings between said cooler and said stationary structure.

ROBERT E. WEILER.

REFERENCES CITED

The following references are of record in the file of this patent:

UNITED STATES PATENTS

| Number | Name | Date |
|---|---|---|
| 1,914,063 | Barbarou | June 13, 1933 |
| 2,402,377 | Davenport | June 18, 1946 |